United States Patent [19]
Xue

[11] Patent Number: 6,049,705
[45] Date of Patent: Apr. 11, 2000

[54] DIVERSITY FOR MOBILE TERMINALS

[75] Inventor: Hongxi Xue, Forest, Va.

[73] Assignee: Ericsson Inc., Research Triangle Park, N.C.

[21] Appl. No.: 09/017,882

[22] Filed: Feb. 3, 1998

[51] Int. Cl.[7] .................................................. H04Q 7/20
[52] U.S. Cl. ...................................... 455/277.1; 455/562
[58] Field of Search .............................. 455/562, 277.1, 455/277.2, 273, 278.1, 272

[56] References Cited

U.S. PATENT DOCUMENTS

| | | | |
|---|---|---|---|
| 4,939,791 | 7/1990 | Bochmann et al. | 455/273 |
| 5,561,673 | 10/1996 | Takai et al. | 455/277.2 |
| 5,606,733 | 2/1997 | Kanayama et al. | 455/273 |
| 5,692,019 | 11/1997 | Chang et al. | 455/277.1 |
| 5,724,666 | 3/1998 | Dent | 455/272 |

*Primary Examiner*—Daniel S. Hunter
*Assistant Examiner*—Myron K. Wyche
*Attorney, Agent, or Firm*—Jenkens & Gilchrist, A Professional Corporation

[57] ABSTRACT

Polarization diversity is achieved in mobile terminals with three antennas. Each of the three antennas are orthogonal to one another. With three orthogonal antennas, the mobile terminal increases the likelihood that at least one antenna's polarity will match that of the incoming signal's wavefront, regardless of how the user orients the mobile terminal. Once a signal has been received by each of the three antennas, they can be selected or combined using a variety of techniques and/or algorithms. Among these techniques are selection diversity, switching selection diversity, fixed combining diversity, and adaptive combining diversity (e.g., maximal ratio combining and interference rejection combining).

7 Claims, 7 Drawing Sheets

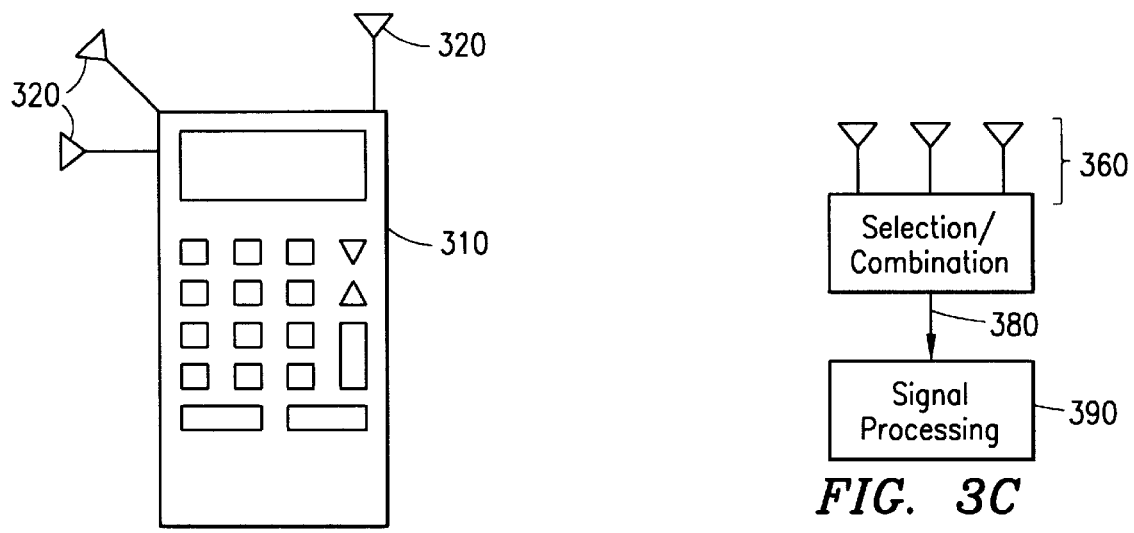
FIG. 3A
FIG. 3C
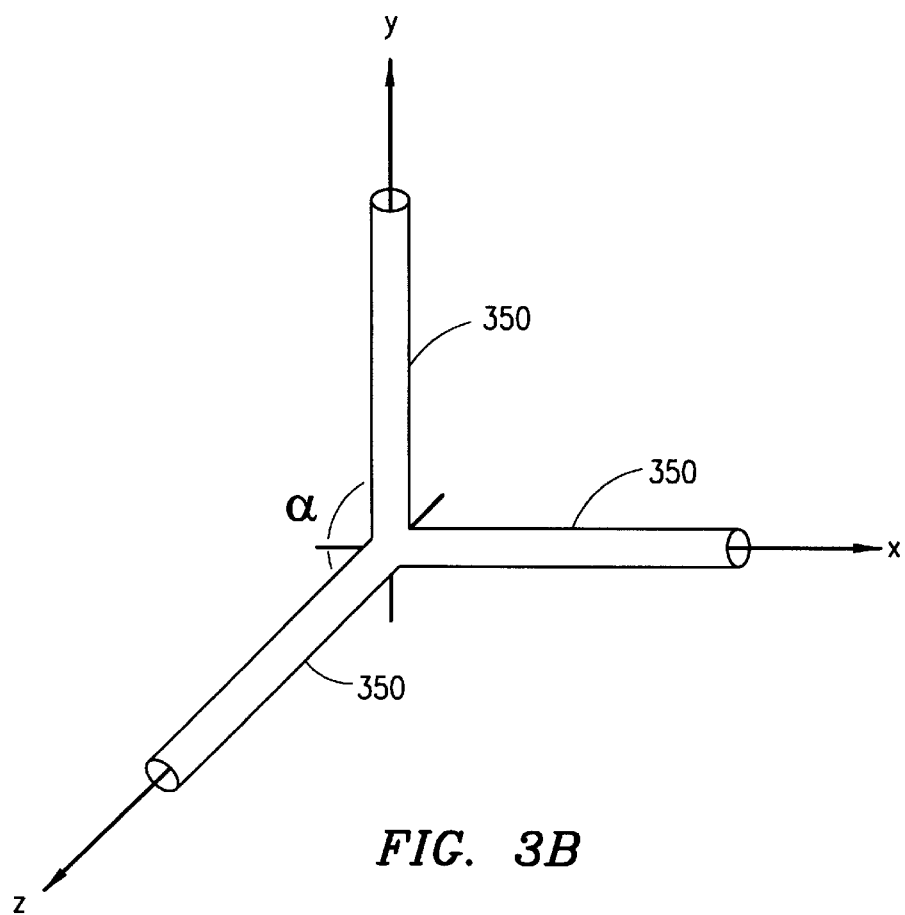
FIG. 3B

DIVERSITY FOR MOBILE TERMINALS

BACKGROUND OF THE INVENTION

1. Technical Field of the Invention

The present invention relates to wireless communications and, in particular, to implementing polarization diversity in mobile terminals.

2. Description of Related Art and Objects of the Invention

Mobile wireless communication is becoming increasingly important for safety, convenience, and efficiency. One prominent mobile communication option is cellular communication. Cellular phones, for instance, can be found in cars, briefcases, purses, and even pockets. Cellular phones, like most mobile communication options, rely on the transmission of electromagnetic radiation from one point to another.

In general, a cellular system is composed of many cells, each with a base station antenna for receiving transmissions. From the base station, the cellular system has interfaces for routing a call through or to the land-based, or terrestrial, telephone network, often referred to as the public switched telephone network (PSTN). The base stations form one half of the cellular system. Cell phones, called mobile stations, mobile terminals, or merely terminals, form the second half of the cellular system. In short then, electromagnetic radiation transmissions between terminals and base stations are an essential component of cellular systems, and such transmissions must be optimized by the cellular system to maximize cellular phone service, quality, and availability.

When communicating via the transmission of electromagnetic radiation, diversity can be used to counteract signal fading, which occurs when a signal's strength decreases. A given radio signal will usually take multiple diverse paths from the transmitter to the receiver. These multiple paths arise from the signal taking a direct path or any one of many reflective paths. As a result, the receiver actually has several versions of the same signal from which to choose for processing. Often, the different paths will not be fading simultaneously, so if the receiver can always be processing the version of the signal with the least fade at a given moment, then the overall transmission will be more reliably received and processed. This is termed path diversity. Diversity in general, however, can be applied to various techniques for creating and/or selecting the current optimum version of the signal.

Referring now to FIG. 1, an example of the benefits of diversity is illustrated. A Graph of Time versus Received Signal Level is provided at 100. Graph 100 represents a mobile terminal with two signal levels from which to choose for processing. Signal One is diagramed at 110, and Signal Two is diagramed at 120. If Graph 100 represents path diversity, then each signal represents the signal arriving via a different path. In Graph 100, selection diversity is implemented by selecting the strongest signal at any given instant for processing. The strongest signal is diagramed at 130 as the Diversity Signal. At Point in Time 140, for example, Graph 100 demonstrates how the mobile terminal switches from processing Signal One 110 to Signal Two 120. Diversity Signal 130 demonstrates how selecting the stronger of Signal One 110 and Signal Two 120 effectively creates a higher averaged received signal power. (It is noted that Diversity Signal 130 is diagramed above the higher of Signal One 110 or Signal Two 120 instead of directly over for diagrammatical clarity.)

In addition to taking advantage of diverse paths (path diversity as described above), the receiver can have two antennas. If the antennas are spaced sufficiently far apart (approximately $0.25\lambda$ for mobiles and $10\lambda$–$20\lambda$ for base stations), then one antenna is often in a better reception position than the other antenna at any given instant. Using two spaced-apart antennas is termed space, or antenna, diversity. If Graph 100 represents space diversity, then each signal of Signal One 110 and Signal Two 120 represents the signal arriving on a different antenna of the two antennas. The Diversity Signal 130 represents the signal selected for processing that is currently strongest, and Point in Time 140 represents a point in which the receiver is switching from one antenna to the other.

Two other examples of diversity are frequency and time. Frequency diversity requires that the transmitter transmit the same signal over two different frequencies because when the frequencies are sufficiently far apart, their fading should vary sufficiently to allow one signal to frequently be strong when the other is fading. Time diversity requires that the transmitter transmit the same signal at two different times because when the duration between the transmissions is sufficiently long, their fading should differ sufficiently whereby the earlier or later signal will be strong while the other is fading. With respect to FIG. 1, Signal One 110 and Signal Two 120 would represent signals transmitted either on different frequencies or at different times. While both frequency and time diversity are useful techniques, they require duplicative transmissions, which waste transmitter resources, e.g., power transmitted.

Another example of diversity is polarization diversity. Polarization diversity improves the average power of the processed signal because signals transmitted on orthogonal polarizations exhibit uncorrelated fading. For example, with respect to FIG. 1, the vertically polarized electromagnetic signal may be represented by Signal One 110, and the horizontally polarized electromagnetic signal may be represented by Signal Two 120. Diversity Signal 130 then represents the selection of the better of the two orthogonally polarized signals.

Polarization diversity reception has occasionally been used at base stations. Referring now to FIG. 2, polarization diversity reception at a base station is illustrated at 200. Base station tower 210 includes a vertically polarized antenna 220 and a horizontally polarized antenna 230. For mobile terminals (which in this application encompasses all portable communication devices, including, but not limited to, cellular phones, citizen band radios, walkie-talkies, etc.), however, there is normally only one transceiving antenna. Those mobile terminals that do have a second antenna (for example, for space diversity) typically employ antennas with low gain, vertical polarization, and omni-directionality. These antennas are usually of monopole or dipole derivatives.

Mobile terminals, whether they are cellular radios, mobile radios, or other types of mobile terminals, can be positioned at any orientation. If they are portable-sized (e.g., approximately 10×8×3 inches), then they might be either laid flat or set upright. If they are hand-held-sized, then they can potentially be held at any orientation during use. Unfortunately, because prior art mobile terminal antennas have a fixed polarization (usually vertically polarized when held in hand and sitting straight up), non-optimum reception results when mobile terminals are held at an orientation other than the one for which they were designed. This becomes an even more acute, system-wide concern for critical communications to terminals such as those used by public safety and similar agencies because these terminals must function adequately even in a network's fringe areas.

As discussed immediately above, hand-held mobile terminals may be held at any orientation during a call. This causes non-optimum reception because most base stations transmit vertically polarized signals. Furthermore, the environment through which electromagnetic signals travel can cause scattering and fading. Scattering can alter the polarization of a signal's wave front before it reaches the mobile terminal's antenna. Fading exacerbates the reception difficulties because it can cause the signal with the best polarization to be the weakest. In other words, the strongest signal may not be in the orientation that the mobile terminal's antenna was designed for. A device or technique for increasing the likelihood that the strongest signal can be received by a correctly polarized antenna is needed.

In summary, mobile terminals have heretofore only incorporated at most two antennas, both of which were of the same polarization. Also, polarization diversity reception has heretofore only been used at base stations and, even then, with only two diversity branches.

A non-exhaustive list of objects of the invention follows:

An object of the invention is to provide a mobile terminal that uses polarization diversity.

An object of the invention is to provide a mobile terminal that uses polarization diversity with three branches.

Another object of the invention is to provide a mobile terminal whose polarization diversity branches are combined using a variety of techniques and algorithms.

Another object of the invention is to implement a three-branch polarization diversity receiver capable of being well-matched to any incoming transmission, regardless of polarity.

Yet another object of the invention is to improve a mobile terminal's reception with respect to polarization diversity.

Yet another object of the invention is to improve an entire communication system by implementing polarization diversity in a mobile terminal.

SUMMARY OF THE INVENTION

According to a preferred embodiment of the invention, polarization diversity is achieved in a mobile terminal by using three antennas. Each one of the three antennas is orthogonal to the other two. With three orthogonal antennas, the mobile terminal increases the likelihood that at least one antenna's polarity will match that of the incoming signal's wave front, regardless of how the user physically orients the mobile terminal.

Once a signal has been received by each of the three antennas, they can be selected or combined using a variety of techniques and algorithms. Selection diversity operates by selecting the signal with the strongest current signal. Switching selection diversity, on other hand, operates by remaining (i.e., continuing) with the currently selected antenna until a predetermined power threshold is no longer met; then, another antenna is tested. Fixed combining diversity co-phases each signal and then sums them while adaptive combining diversity can properly weight each signal before summing them (maximal ratio combining algorithm) or can steer a null toward interference (interference rejection combining algorithm).

By receiving a transmitted signal on three orthogonal antennas, a mobile terminal increases the probability that one signal is received by an antenna with a polarity matching that of the strongest incoming signal. After appropriately selecting from or combining these three different signals, a better signal is attained as compared to not utilizing polarization diversity. The attained signal is then forwarded for further receive processing.

BRIEF DESCRIPTION OF THE DRAWINGS

A more complete understanding of the method and apparatus of the present invention may be had by reference to the following detailed description when taken in conjunction with the accompanying drawings wherein:

FIG. 3A illustrates a mobile terminal with three antennas according to the current invention;

FIG. 3B illustrates three approximately orthogonal antennas according to the current invention;

FIG. 3C illustrates another aspect of achieving diversity according to the current invention;

DETAILED DESCRIPTION OF THE DRAWINGS

Figure 1:
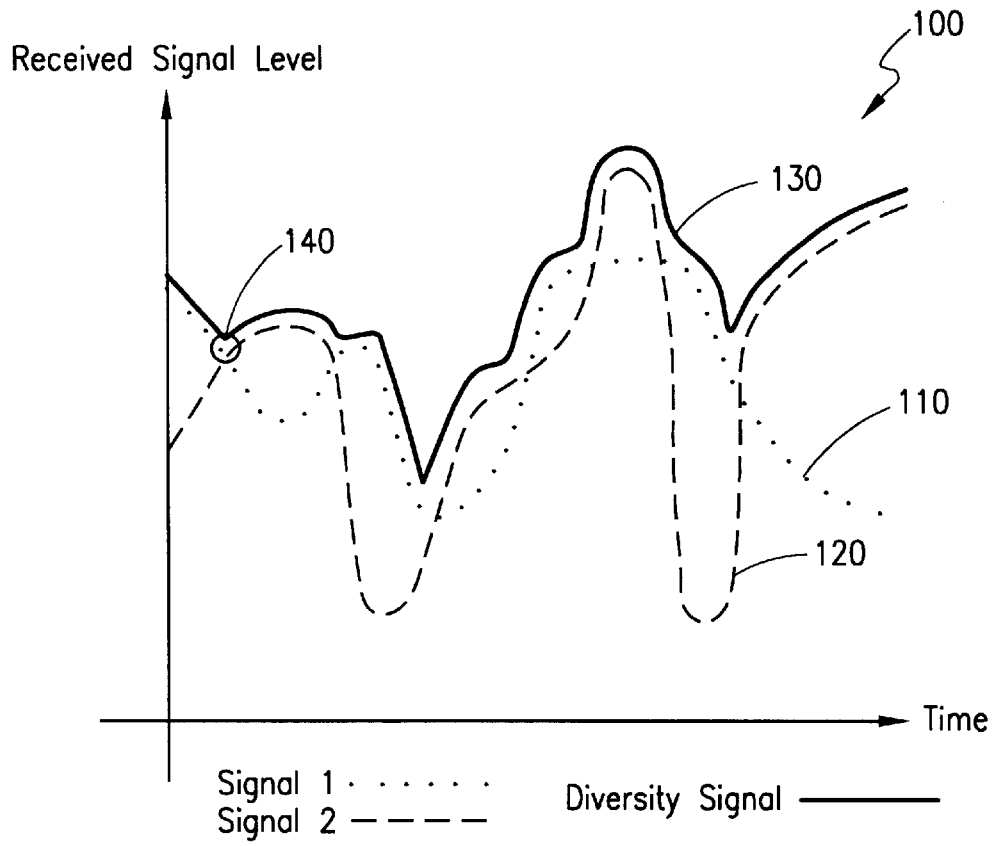
FIG. 1 illustrates the concept of diversity in graphical form.
Figure 2:
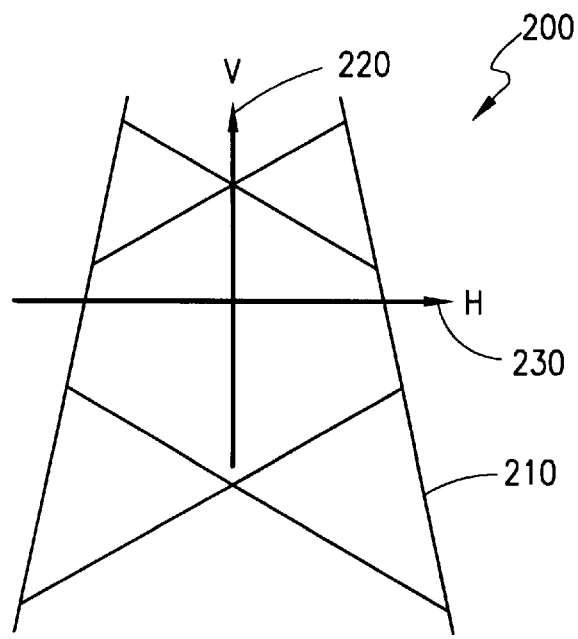
FIG. 2 illustrates polarization diversity reception at a base station.

A preferred embodiment of the present invention and its advantages are best understood by referring to FIGS. 3A–8B of the drawings, like numerals being used for like and corresponding parts of the various drawings.

Mobile terminals operate in a three dimensional environment. For instance, the user can rotate the mobile terminal in any direction. According to a preferred embodiment of the invention, three antennas are provided for a mobile terminal. Referring now to FIG. 3A, mobile terminal 310 is illustrated. Three antennas 320 are preferably connected to the mobile terminal 310 at diverse angles/orientations. With the three orientations of the three antennas 320, the likelihood that one antenna's orientation closely matches the wave polarization of the strongest incoming signal is increased.

Though the three antennas 320 are pictured external to mobile terminal 310, one, two, or all three antennas 320 can be located within the housing of mobile terminal 310. Each of the three antennas 320 can be of monopole, dipole, loop, strip, microstrip, or patch antenna derivatives, or any other form of antennas suited for the application of the mobile terminal. It should be noted that all three antennas 320 need not be of the same type; they may be any desirable combination.

Referring now to FIG. 3B, a presently preferred embodiment of a set of three antennas is illustrated. Each of three antennas 350 are orthogonal ($\alpha=90°$) to one another. Preferably, each of three antennas 350 are approximately orthogonal to each other to maximize the probability that at least one antenna will be properly polarized with the wave polarization of the incoming signal, regardless of the orientation of the mobile terminal. It should be reiterated that any type of antenna is within the scope of the invention, i.e., three loop antennas, for example, could replace the three antennas 350 as pictured. It is noted here that the invention's proper scope also covers polarization diversity (i) of two branches in mobile terminals and (ii) of three branches in general. Furthermore, at least some improvement can be attained when using more than three polarization branches. The diversity selection and combination techniques and algorithms described hereinbelow also apply to terminals with two polarization diversity branches from two antennas.

As explained hereinabove, diversity is beneficial to wireless communication. According to one embodiment of the invention, the sources for the diverse signals arise from three approximately orthogonal antennas. To ultimately achieve any benefits from diversity, the diverse signals must be combined (or selected or otherwise processed) in some manner. In short, the best signal or the best combination of signals should be extracted.

Referring to FIG. 3C, another aspect for achieving diversity is pictured. Three Polarizationally Diverse Antennas (TPDA) 360 are linked to Selection/Combination Unit 370. Selection/Combination Unit (SCU) 370 applies a technique and/or an algorithm (as described hereinbelow) to optimally select or produce a signal from TPDA 360. The produced signal, Output Signal 380, is then sent to Signal Processing Unit 390 for decrypting, decoding, etc. by the associated mobile terminal.

Figure 4A:
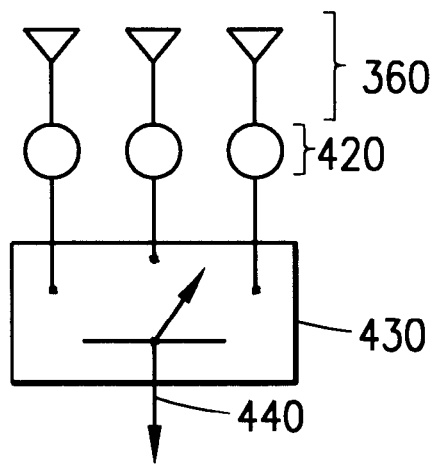
FIG. 4A illustrates polarization selection diversity according to the current invention.

A first technique for selecting from among the TPDA 360 in SCU 370 is Selection Diversity. Selection Diversity outputs the diversity branch with the highest signal to noise ratio (SNR). Referring now to FIG. 4A, TPDA 360 each receive a signal. Variable Gain Units (VGU) 420 are adjusted to provide the same average SNR for each antenna/polarization branch. Selector 430 then connects the branch with the highest instantaneous SNR to the Output 440. It is noted that it is often easier to select the branch with the largest (S+N)/N [where S is signal and N is noise] because measuring SNR is difficult in practice. It is also noted that the instantaneous SNR value is acquired in practice by using selection circuitry whose time constants are shorter than the reciprocal of the signal fading rate.

Figure 4B:
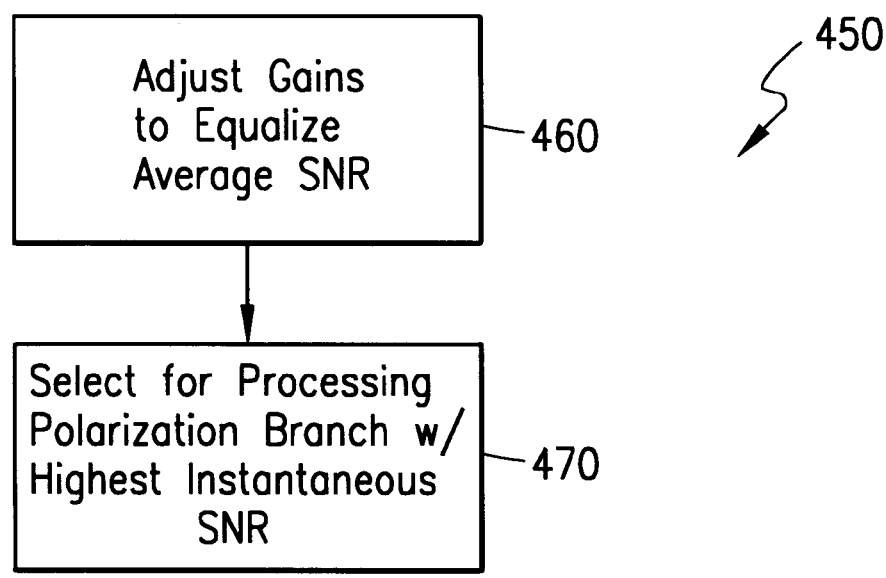
FIG. 4B illustrates polarization selection diversity in flowchart form according to the current invention.

Referring to FIG. 4B, a flowchart explaining the process of selection diversity is diagramed at 450. Step 460 provides for the equalization of the average SNR of each branch by adjusting the gains with VGUs 420. Step 470 provides for the selection of the polarization branch with the highest instantaneous SNR for output to the processing circuitry. Referring again to FIG. 1, it is noted that Diversity Signal 130 is the output produced by a selection diversity technique applied to Signal One 110 and Signal Two 120. Thus, the output 440 of the selector 430 represents the combined diversity signal 130 of the antennas 360.

Figure 5A:
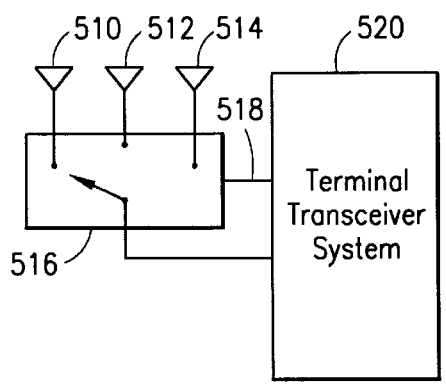
FIG. 5A illustrates polarization switching selection diversity according to the current invention.

A second technique for selecting from among the TPDA 360 in SCU 370 (FIG. 3C) is Switching Selection Diversity, also called feedback or scanning diversity. This switching selection technique advantageously requires only one receiving chain, thus simplifying the mobile terminal. Referring now to FIG. 5A, Default Primary Antenna (DPA) 510 is the preferred antenna under all conditions. First Secondary Antenna 512 and Second Secondary Antenna 514 complete the TPDA 360. Each antenna 510, 512, and 514 can be selected by Switch Selector 516 in response to instructions received via Control Line 518 from Terminal Transceiver System (TTS) 520.

Figure 5B:
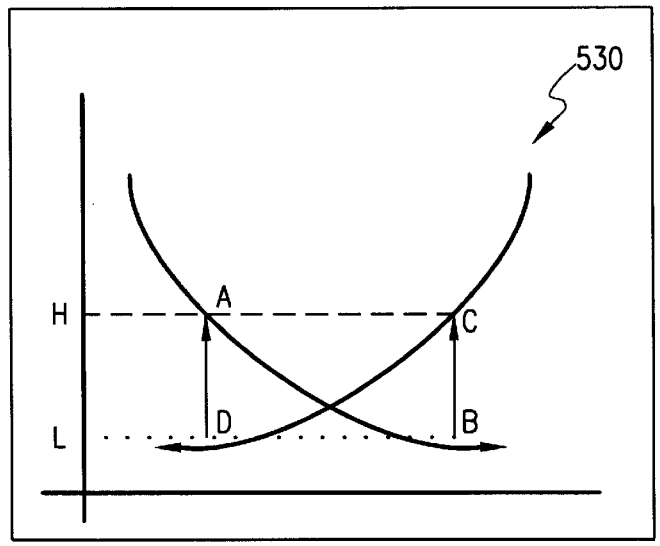
FIG. 5B illustrates polarization switching selection diversity in graphical form according to the current invention.
Figure 5C:
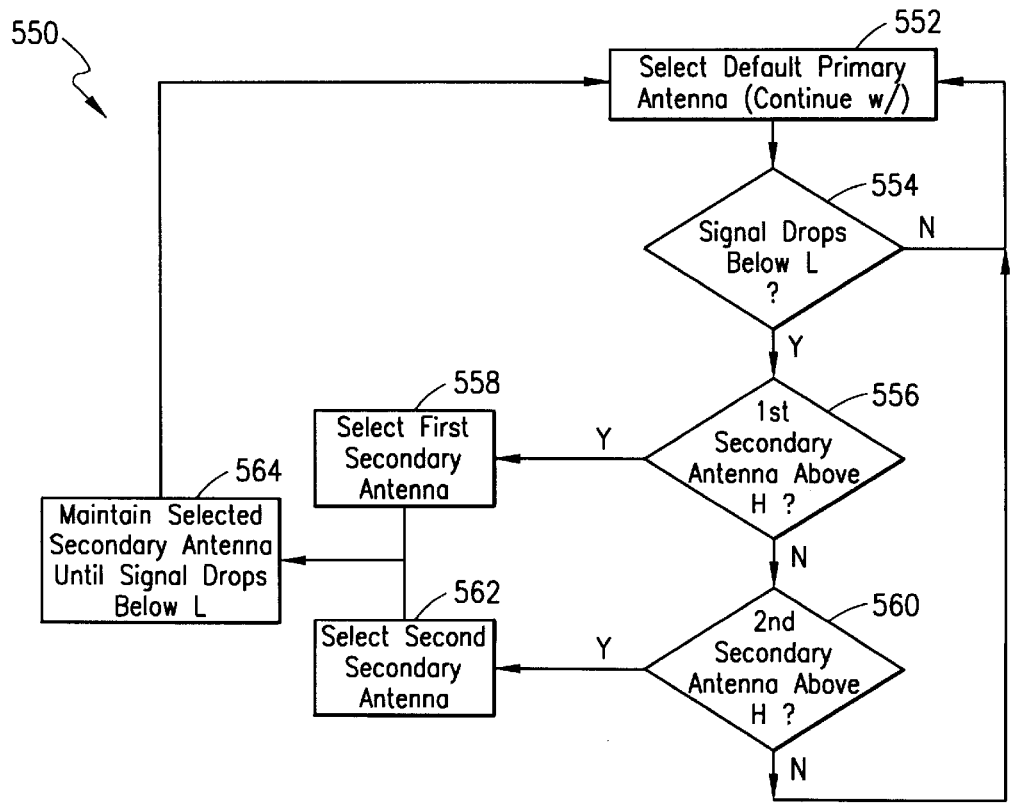
FIG. 5C illustrates polarization switching selection diversity in flowchart form according to the current invention.

TTS 520 operates according to the following set of rules illustrated in FIGS. 5B and 5C. FIG. 5B illustrates Switch Selecting Criteria (SSC) graph 530, and FIG. 5C illustrates Switching Selection Diversity flowchart 550. Initially, DPA 510 is selected by Switch Selector 516 under the instruction of TTS 520 via Control Line 518 as indicated by Step 552. The signal level on DPA 510 is monitored. If the signal level maintains a certain threshold, for example it stays above "L", then the TTS 520 makes no changes as indicated by Decision Step 554. If the signal level drops below a certain level, for example "L" (by dropping from point A to point B as shown in SSC graph 530), then TTS 520 instructs Switch Selector 516 to switch to another antenna, e.g., First Secondary Antenna 512, as indicated by Decision Step 554 and Decision Step 556.

The signal level on the First Secondary Antenna 512 is tested at Decision Step 556 to determine whether it exceeds a certain threshold, for example "H". If the signal level on the First Secondary Antenna 512 does exceed"H", then TTS 520 instructs the Switch Selector 516 to select the First Secondary Antenna 512 at Step 558. If the signal level on the First Secondary Antenna 512 does not exceed "H", then at Decision Step 560 the Second Secondary Antenna 514 is tested to determine whether it exceeds a certain threshold, for example "H". If the signal level on the Second Secondary Antenna 514 does exceed "H", then TTS 520 instructs Switch Selector 516 to select the Second Secondary Antenna 514 at Step 562. If the signal level on the Second Secondary Antenna 514 does not exceed "H", then TTS 520 instructs Switch Selector 516 to switch to and to select DPA 510 as indicated by Decision Steps 560 and 552.

While the Switch Selector 516 has selected either the First Secondary Antenna 512 or the Second Secondary Antenna 514, the signal level is continually tested to determine whether it falls below a given threshold, for example "L". While the signal level is above the given threshold "L", the selector continues with the current secondary antenna as indicated by Step 564. If the signal level falls below the threshold level "L", for example from point C to point D as shown in SSC graph 530, then the TTS 520 instructs Switch Selector 516 via Control Line 518 to return to DPA 510 as indicated by Step 564 and Step 552.

The instruction to toggle between any two antennas 510, 512, or 514 from TTS 520 to Switch Selector 516 can be designed to occur only upon a certain event. For example, one criterion could be requiring that the switching occur just prior to the beginning of a time slot. Other threshold schemes could be implemented without departing from the spirit and scope of the invention. For instance, the toggling between antennas can be triggered during the fall from "H" to "L" somewhere along the curve delineated by point A and point B (or point C and point D). The process reflected by the flowchart can be altered so that when either secondary antenna's signal is dropping, the opposite secondary antenna is tested before trying DPA 510.

Figure 6A:
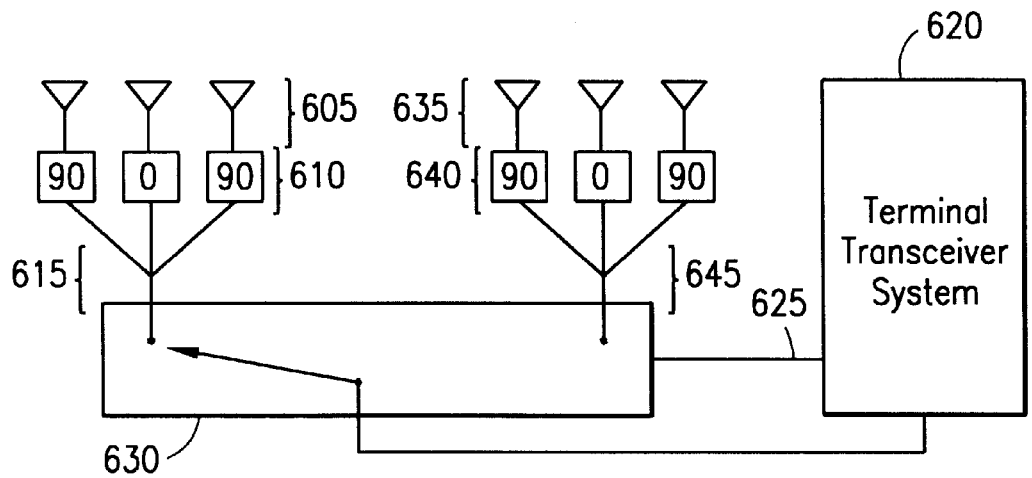
FIG. 6A illustrates fixed combining diversity according to the current invention.
Figure 6B:
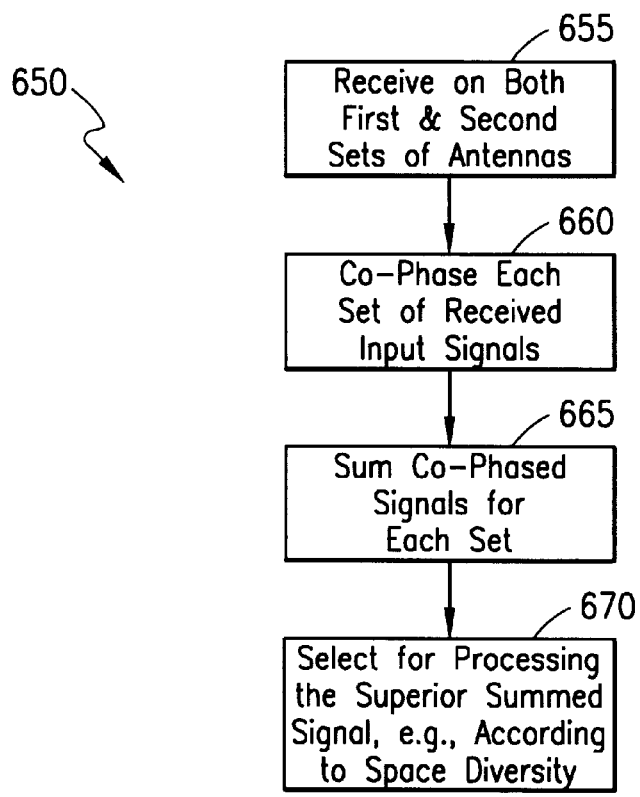
FIG. 6B illustrates fixed combining diversity in flowchart form according to the current invention.

A third technique for selecting from among the TPDA 360 using SCU 370 (FIG. 3C) is Fixed Combining Diversity, sometimes called Equal Gain Combining Diversity. The Fixed Combining Diversity technique can advantageously produce an acceptable signal from a number of unacceptable input signals. Referring now to FIG. 6A, each antenna from a First TPDA 605 is connected to one co-phaser of a First Three Co-phasers 610. Usually, equal gain combining diversity requires variable co-phasing. Here, however, when the First TPDA 605 are all orthogonal to one another, the ideal phase difference is 90 degrees. Hence, the appropriate phasing is diagramed at the First Three Co-phasers 610. Each of the three inputs are summed at a First Summer 615. The three inputs are combined in this manner and can constitute the output to TTS 620.

In FIG. 6A, a second set of TPDA is included. Each antenna in the Second TPDA 635 is connected to one co-phaser of the Second Three Co-phasers 640 and then combined by summing at a Second Summer 645. The Switch Selector 630 can toggle from the First TPDA 605 (at the output of the First Summer 615) to the Second TPDA 635 (at the output of the Second Summer 645) based on instructions from the TTS 620 over the Control Line 625. The Second TPDA 635 can be, for example, spatially separated from the First TPDA 605. The Switch Selector 630 can then choose the better of the two TPDA 605 and 635 for reception and subsequent processing. In other words, a second diversity (e.g., space or antenna diversity) may be implemented in addition to polarization diversity in FIG. 6A.

Although two sets of TPDA 605 and 635 are depicted in FIG. 6A and included in the process diagramed in a Fixed Combining flowchart 650, fixed combining can be implemented with one set of antennas (one level of diversity). Now referring to FIG. 6B, the Fixed Combining flowchart 650 is illustrated. In Step 655, signals are received on both the First TPDA 605 and the Second TPDA 635. In Step 660, the received signals are co-phased by the First Three Co-phasers 610 and the Second Three Co-phasers 640. The co-phased signals for each of the First TPDA 605 and the Second TPDA 635 are then summed in Step 665. Finally, in Step 670, the better of the two outputs from the First Summer 615 and the Second Summer 645 is selected and sent to the TTS 620 for further processing as instructed by the TTS 620 over the Control Line 625. The better of the two outputs can be determined according to many techniques, e.g., space diversity.

A fourth technique for selecting from among the TPDA 360 in SCU 370 (FIG. 3C) is Adaptive Combining Diversity. With the rapid advancement of processing abilities in mobile terminals, Adaptive Combining Diversity can be a reality in many mobile communication situations, e.g., cellular, Personal Communication System (PCS), Personal Communication Network (PCN), Universal Mobile Telecommunication System (UMTS), and International Mobile Telecommunication 2000 (IMT2000). For instance, integrated circuit technology makes it possible to use multiple receiving chains, even in handheld terminals. Among the many Adaptive Combining Diversity algorithms that benefit from improvements in digital signal processing (DSP) abilities are maximal ratio combining (MRC) and interference rejection combining (IRC). Using an adaptive combining algorithm advantageously permits a reduction in base station transmitter power, increases reliability, and reduces overall system cost. Each of the adaptive combining algorithms are preferably realized in a DSP unit.

Figure 7A:
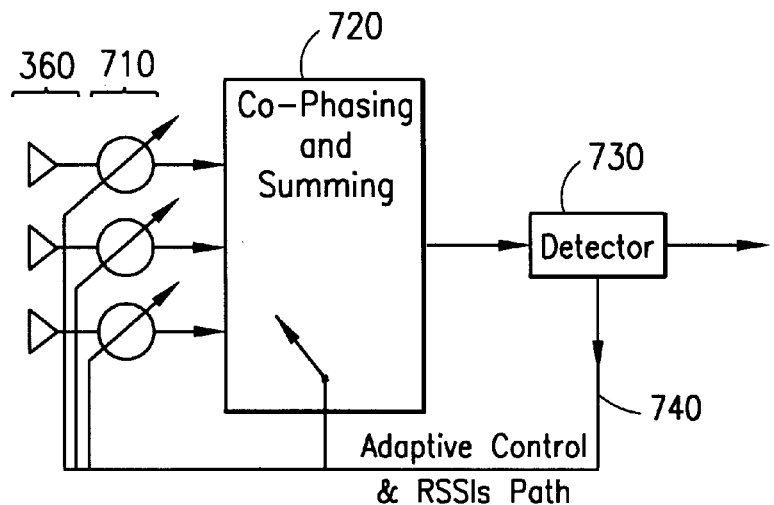
FIG. 7A illustrates a maximal ratio combining (MRC) algorithm according to the current invention.

Referring now to FIG. 7A, an example of the MRC algorithm is illustrated. Signals are received on the TPDA 360 and then are input to the Adapting Variable Gain Units (AVGU) 710. In this feedback circuit, a Detector 730 produces Received Signal Strength Indications (RSSIs) and feeds the RSSIs back into the AVGU 710 via an Adaptive Control and RSSIs Path 740. The Detector 730 can be either m detectors or one detector undergoing m iterations (with m=3 here because of the TPDA 360). The signals from all three branches are weighted according to their individual signal voltage to noise power ratios (in the AVGU 710) and then co-phased (in a Co-phasing and Summing Unit (CSU) 720).

After co-phasing, the signals are summed in the CSU 720. The output of the CSU 720 is input to the Detector 730, which serves to provide the control feedback signal (via the Adaptive Control and RSSIs Path 740) as well as the output signal to be forwarded for receive processing. The MRC algorithm produces an output SNR from the Detector 730 equal to the sum of the individual SNRs and can, in the process, produce an output with an acceptable SNR even when none of the individual input signals are themselves acceptable.

Figure 7B:
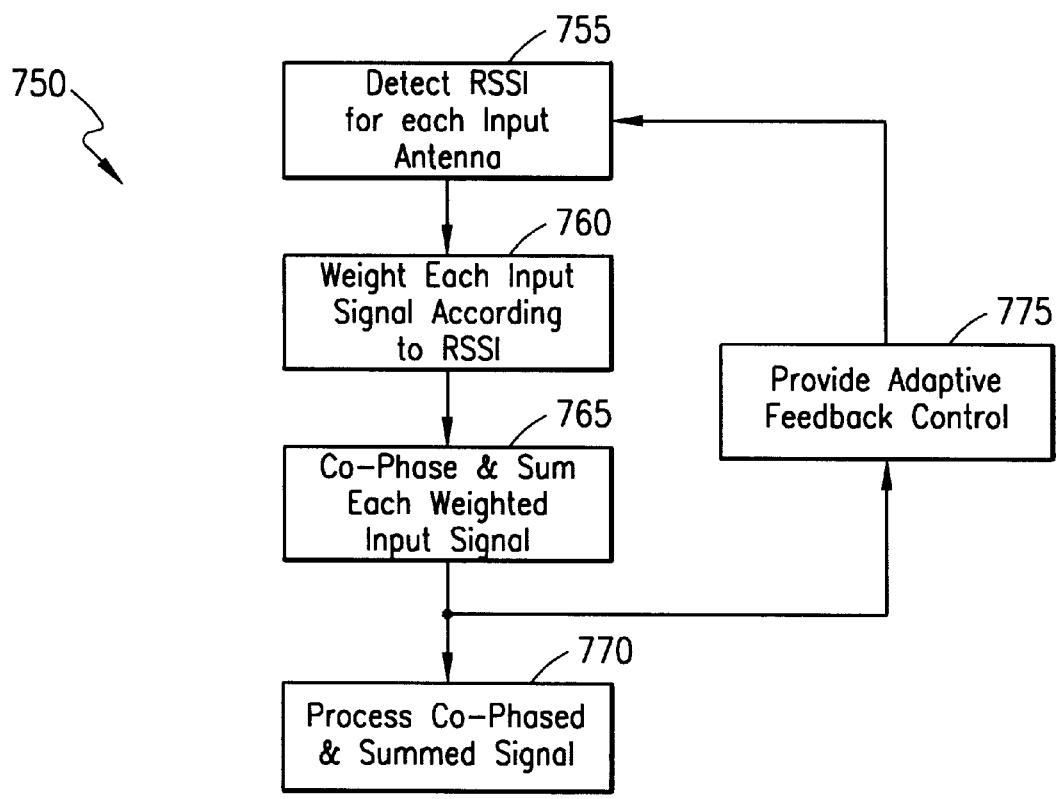
FIG. 7B illustrates an MRC algorithm in flowchart form according to the current invention.

Referring now to FIG. 7B, the MRC flowchart 750 is illustrated. The RSSI for each input antenna (the TPDA 360) is detected at Step 755 by the Detector 730. Each input signal is weighted according to the RSSI at Step 760 by the AVGU 710. At Step 765, each weighted signal is co-phased and summed by the CSU 720. Meanwhile, the Detector 730 is providing the ACS 740 to the AVGU 710 at Step 775. Finally, the co-phased and summed signal that is output from the Detector 730 can be processed at Step 770.

Figure 8A:
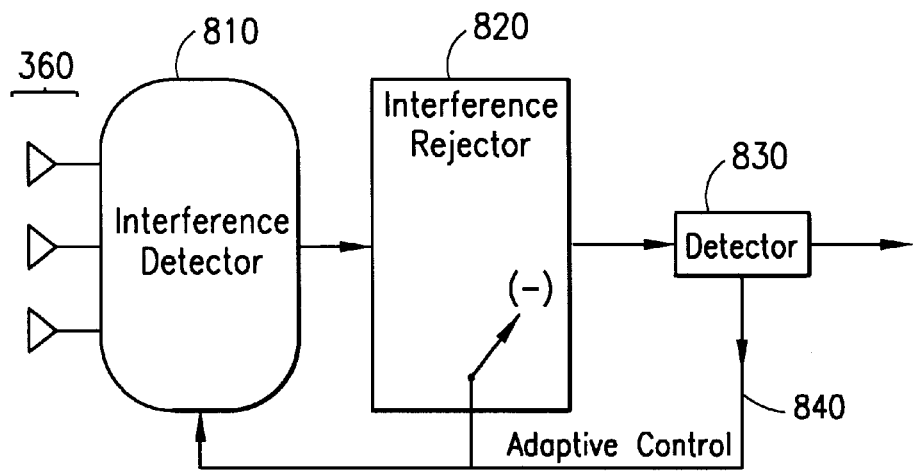
FIG. 8A illustrates an interference rejection combining (IRC) algorithm according to the current invention.

Referring now to FIG. 8A, an example of the IRC algorithm is illustrated. In contrast to MRC, which excels at processing decorrelated multipass signals, IRC excels at processing signals that are highly correlated. IRC achieves optimum performance with k antennas and no more than k−1 interfering signals. Incoming signals are received on the TPDA 360 and are input to an Interference Detector (IFD) 810. IFD 810 relies on the high correlation of the incoming signals along with a control feedback signal (the Adaptive Control Signal (ACS) 840) from a Detector 830 to detect one or more interferers.

Preferably, with three receive antennas, no more than two interferers will need to be rejected. An Interference Rejector (IFR) 820 electronically moves the antenna reception beam to steer at least one null to the interferer(s). The Detector 830 can subsequently detect an interference-reduced incoming signal, provide the ACS 840 to the IFD 810, and output a signal for further receive processing.

Figure 8B:
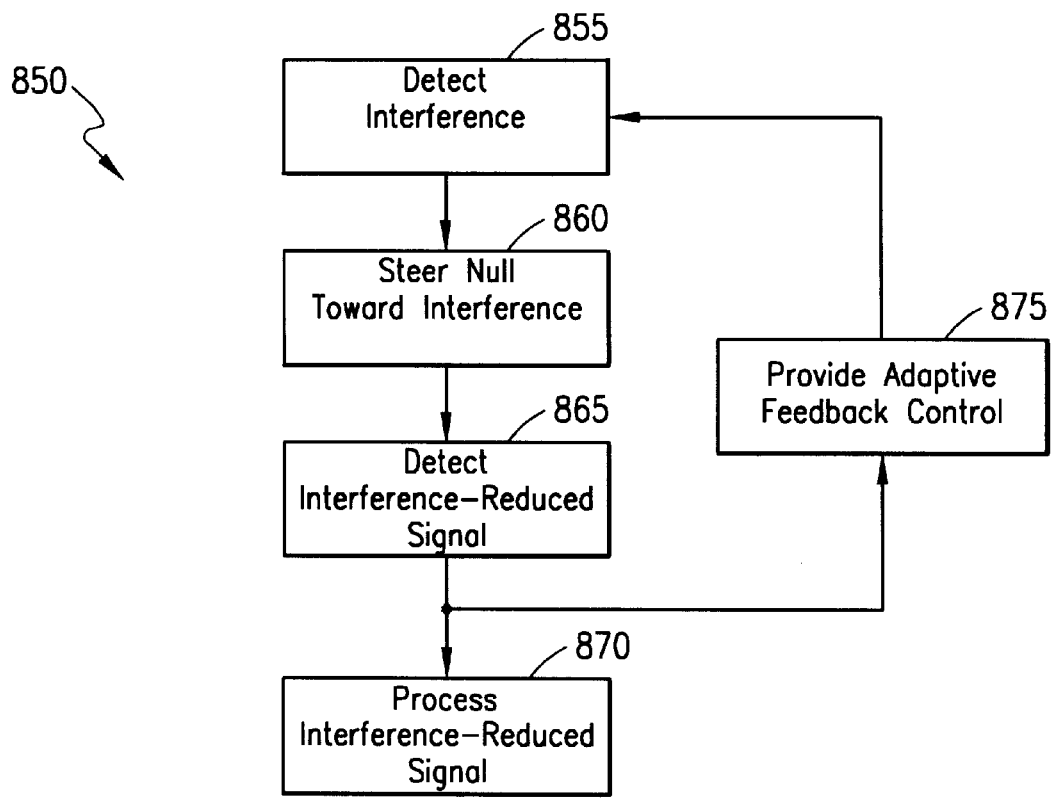
FIG. 8B illustrates an IRC algorithm in flowchart form according to the current invention.

Referring now to FIG. 8B, the IRC flowchart 850 is illustrated. Interference of signals incoming on the TPDA 360 is detected by the IFD 810 at Step 855. The IFR 820 alters the receiving pattern to steer a null to interference (e.g., co-channel interference) at Step 860. At Step 865, the Detector 830 detects the interference-reduced signal and forwards the output signal to enable further receive processing at Step 870. Meanwhile, the Detector 830 is also providing the ACS 840 to the IFD 810 at Step 875 for feedback control. It is noted that the IRC algorithm performs well in interference-limited environments such as cellular communications systems.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims. For example, selection/combination techniques and/or algorithms other than those explicitly described above can be used without departing from the spirit and scope of the polarization aspect of the invention. Additionally, any algorithm (e.g., Viterbi or recursive least squares, as well as MRC and IRC) can be utilized regardless of the combining technique.

What is claimed is:

1. A mobile terminal utilizing polarization diversity, said mobile terminal comprising:

a first group of antennas, said first group of antennas including at least a first, a second, and a third antenna operatively connected to a receiver; and selecting circuitry for selecting between said first antenna, said second antenna and said third antenna to select an antenna that substantially matches a wave polarization of an incoming signal, said selecting circuitry selecting a default antenna among said first, second and third antenna, said selecting circuitry detecting when a received signal on said default antenna drops below a first predetermined threshold and switching to a secondary antenna when said received signal drops below said first predetermined threshold, said selecting circuitry switching from said secondary antenna to said default antenna when said signal level is above a second predetermined level.

2. The mobile terminal of claim 1, wherein:

said first, said second, and said third antennas are approximately orthogonal to one another.

3. A mobile terminal utilizing polarization diversity, said mobile terminal comprising:

a first group of antennas including a first and a second antenna operatively connected to a receiver circuitry;

a second group of antennas including a third and a fourth antenna operating connected to said receiver circuitry;

first combining circuitry for co-phasing and combining received signals from said first set of antennas to provide a first composite signal;

second combining circuitry for a co-phasing and combining received signals from said second set of antennas to provide a second composite signal; and selecting circuitry for receiving said first composite signal and said second composite signal, said selecting circuitry selecting the stronger combined and co-phased signal and providing the selected composite signal to a receiver circuit.

4. The mobile terminal of claim 3, wherein:

said first and said second antennas are approximately orthogonal to one another.

5. The mobile terminal of claim 3 wherein said first combining circuitry co-phases signals from said first and second antenna at ninety degrees, said second combining circuitry co-phases signal from said third and fourth antenna at ninety degrees.

6. A method of receiving signals at a mobile terminal utilizing polarization diversity, said method comprising the steps of:

receiving an incoming signal at a first group of antennas which includes a first antenna, a second antenna and a third antenna, said first, second, and third antennas being substantially orthogonal to each other, said first group of antennas being adapted to be operatively connected to a receiver;

selecting a default antenna from among the first, second, and third antennas;

determining whether an incoming signal strength of said incoming signal is below a first predetermined level;

switching to a secondary antenna from among said first, second, and third antennas if said incoming signal strength is below said first predetermined level;

switching from said secondary antenna to said default antenna if said incoming signal strength rises above a second predetermined level; and switching from said secondary antenna to a second secondary antenna if said incoming signal strength is below a third predetermined level.

7. The method of claim 6, wherein said step of selecting further comprises the steps of:

adjusting a gain for each of said first, second, and third antennas to equalize an average SNR for each of said first, second, and third antennas; and selecting among said first, second, and third antennas an antenna with the highest average SNR.

* * * * *